United States Patent [19]

Hasegawa et al.

[11] Patent Number: 4,838,665
[45] Date of Patent: Jun. 13, 1989

[54] TEMPERATURE-COMPENSATED LENS SYSTEM

[75] Inventors: Shinichi Hasegawa; Takayuki Yoshioka, both of Tokyo, Japan

[73] Assignee: Pioneer Electronic Corporation, Tokyo, Japan

[21] Appl. No.: 77,723

[22] Filed: Jul. 27, 1987

[30] Foreign Application Priority Data

| Jul. 25, 1986 | [JP] | Japan | 61-175337 |
| Jul. 25, 1986 | [JP] | Japan | 61-175338 |
| Jul. 25, 1986 | [JP] | Japan | 61-175339 |
| Jul. 25, 1986 | [JP] | Japan | 61-175340 |

[51] Int. Cl.$^4$ .............. G02B 3/12; G02B 13/18
[52] U.S. Cl. ..................... 350/418; 350/432
[58] Field of Search .................. 350/418, 432

[56] References Cited

U.S. PATENT DOCUMENTS

| 695,606 | 3/1902 | Grun | 350/418 |
| 2,794,368 | 6/1957 | Kosa | 350/418 |
| 3,738,734 | 6/1973 | Tait et al. | 350/418 |
| 3,944,337 | 3/1976 | Ruben | 350/432 |

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A temperature-compensated lens system of positive power includes a plastic lens having a convex surface, and a liquid lens of negative power made of a liquid or gel material and held against the convex surface of the plastic lens, the liquid lens having a temperature coefficient dn/dT ranging from $-4 \times 10^{-4}$ to $-2.0 \times 10^{-4}/°C$. indicating the temperature-dependent variation in the refractive index of the liquid lens. The lens system is highly resistant to temperature-dependent variations.

38 Claims, 4 Drawing Sheets

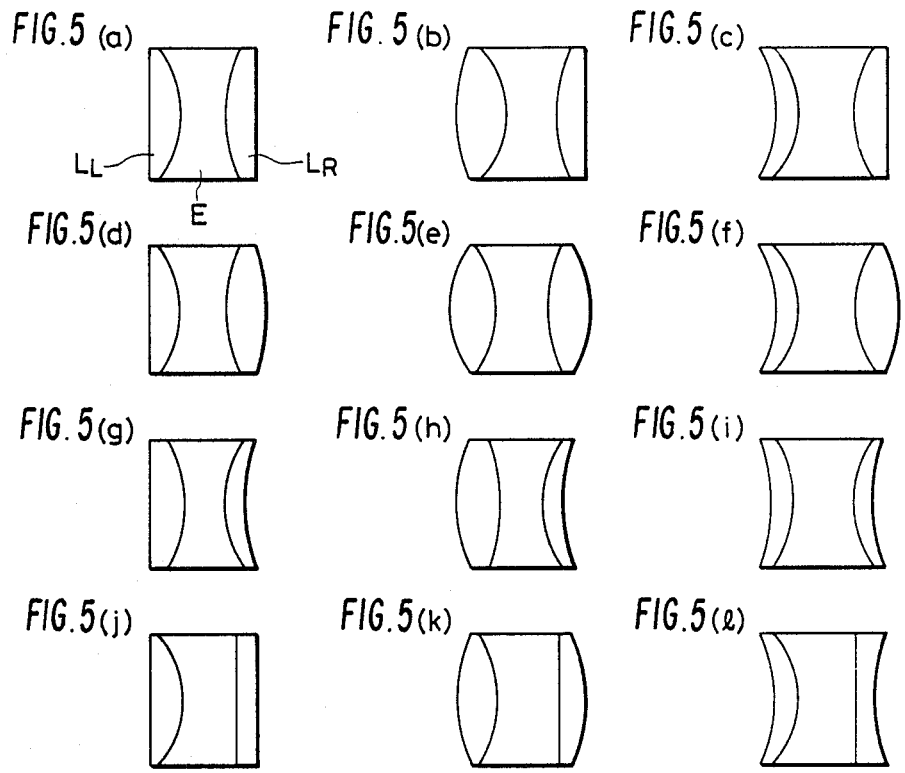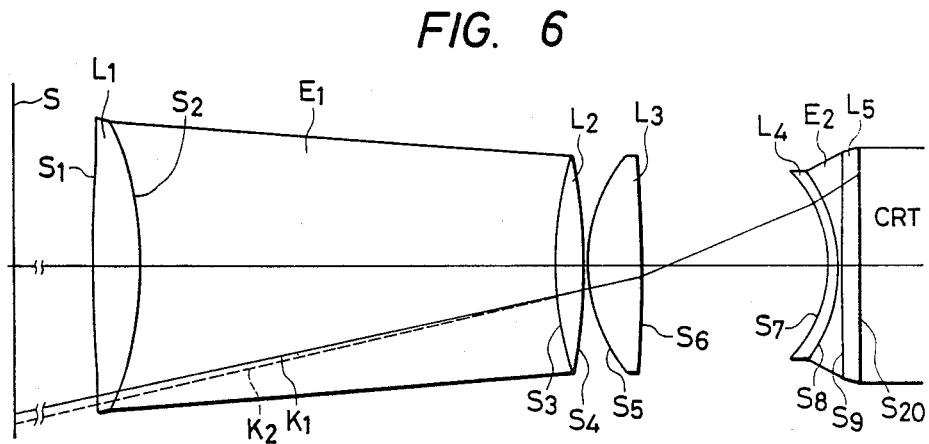

TEMPERATURE-COMPENSATED LENS SYSTEM

BACKGROUND OF THE INVENTION

1. Field of the Invention

The present invention relates to a lens system, and more particularly to a temperature-compensated lens system comprising a plastic lens and a liquid lens for compensating variations in temperature at the image forming plane of the lens system.

2. Background of the Invention

Most conventional lens systems comprise a plurality of lenses which are all made of glass. However, more and more plastic lenses are used since lenses are often required to have aspherical surfaces to reduce aberration and also since they need to be smaller in weight and manufactured at less cost. There are now put to use both plastic lens systems with all of their lenses made of plastic and also hybrid lens systems including both glass and plastic lenses. The plastic lens systems are however disadvantageous in that the image forming plane tends to be significantly displaced due to a temperature-dependent variation in the refractive indices of the plastic lenses which puts the image out of focus. While the hybrid lens systems are devised to improve the temperature characteristics of lens systems, they still fail to provide fully satisfactory performance because the refractive indices of the plastic lenses with their refracting surfaces involved in establishing the lens power are subject to temperature-dependent variations.

One hybrid lens system of large size which has heretofore been employed in a projection-type television display will be described with reference to FIG. 1 of the accompanying drawings. A light beam $K_2$ emitted from an electron gun CRT (cathode ray tube) shown at the right hand end passes through a sealed glass sheet $L_5$ in the electron gun CRT, a cooling liquid $E_2$ cooled by a liquid of the electron gun CRT and serving as a liquid lens, a lens $L_4$ of plastic which seals the cooling liquid $E_2$, a convex lens $L_3$ of plastic having an aspherical surface $S_6$, a convex lens $L_2$ of glass having the maximum power of the lens system, and a plastic lens $L_1$. The thus transmitted light beam $K_2$ falls on a large-size projection screen S for displaying an image as it is scanned by the light beam $K_2$ from the electron gun CRT. The light beam $K_2$, indicated by the dotted line, which is emitted from the electron gun CRT is refracted by the surface $S_3$ of the lens $L_2$ and also by the surfaces $S_2$ and $S_1$ of the lens $L_1$ before it reaches the screen S. Denoted at $S_1$ through $S_9$ and $S_{20}$ are lens surfaces. The lens surfaces $S_2$, $S_6$ and $S_7$ are aspherical for correcting aberration.

With the conventional lens system arrangement, however, temperature-dependent variations in the refractive indices and focal lengths of the lenses, particularly temperature-dependent variations in the total power of the lens system, cannot be eliminated. Hence, the lens system fails to provide high resolution, brightness, and clear profiles for high image quality.

Where glass lenses suffering small temperature-dependent variations in refractive indices are employed, the above problems can be avoided to a certain extent. However, the glass lenses are heavy, cannot be ground with ease for producing aspherical surfaces, and are highly expensive. Consequently, most conventional lens systems of the type in question are of the hybrid type in which only a convex lens of positive power, such as lens $L_2$ in the lens system shown in FIG. 1, is made of glass.

Although plastic lenses are lightweight, can be ground with ease for aspherical surfaces, and are less costly, the lens system should not be made entirely of plastic material inasmuch as temperature-dependent variations in refractive indices of plastic lenses are large.

Where a hybrid lens system is employed, since the refracting surfaces of the plastic lenses are responsible for establishing the lens power, images formed on the screen may be out of focus due to temperature-dependent variations in the refractive indices of the plastic lenses.

SUMMARY OF THE INVENTION

It is an object of the present invention to provide a lens system which is highly resistant to temperature-dependent variations.

According to the present invention, there is provided a temperature-compensated lens system of positive power including a plastic lens having a convex surface, and a liquid lens of negative power made of a liquid or gel material and held against the convex surface of the plastic lens. The liquid lens has a temperature coefficient dn/dT ranging from $-4 \times 10^{-4}$ to $-2.0 \times 10^{-4}/°C$. which is indicative of the temperature-dependent variation in the refractive index of the liquid lens. The lens system in highly resistant to temperature-dependent variations.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5a-l show lens systems view of a lens system according to an embodiment of the present invention.

FIG. 6 is a schematic view of a lens system according to an embodiment of the present invention.

DESCRIPTION OF THE PREFERRED EMBODIMENTS

Figure 1:
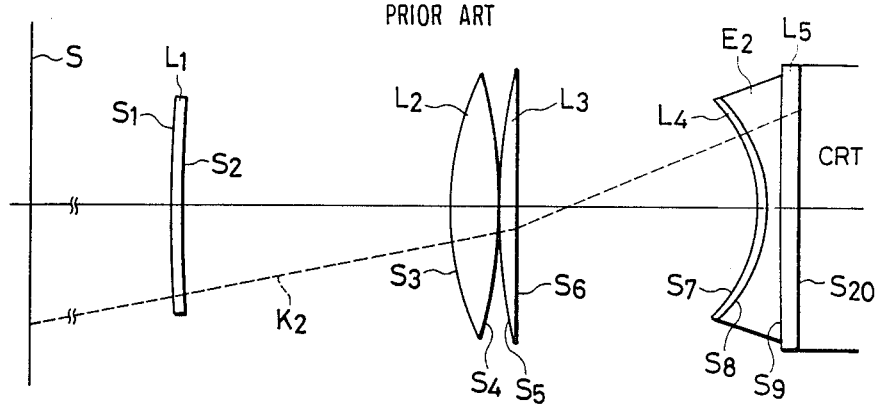
FIG. 1 is a schematic view of a conventional lens system.
Figure 2A:
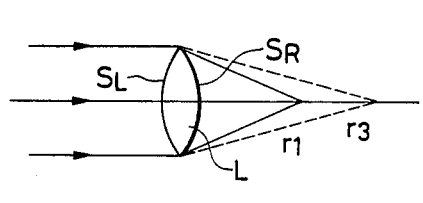
FIGS. 2(A) and 2(B) are views explaining the principles of the present invention.

FIG. 2(A) illustrates a plastic lens L with left and right refracting surfaces SL and SR and having positive power. The plastic material of the lens L has a refractive index with its temperature coefficient dn/dT ranging from $-1.6 \times 10^{-4}$ to $-1.1 \times 10^{-4}/°C$. Thus, the refractive index decreases as the temperature increases. The plastic lens L of positive power has its focal length $r_1$ which increases as the temperature rises in a positive direction to a focal length $r_3$, as indicated by the dotted lines.

Figure 2B:
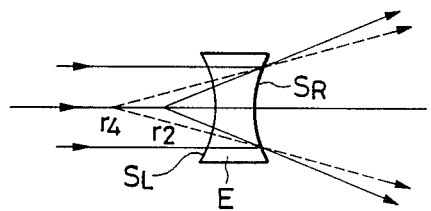

FIG. 2(B) shows a lens E made of a liquid or gel material and comprising left and right refracting surfaces SL and SR, the lens having negative power. The liquid or gel material of the lens E has a refractive index with its temperature coefficients dn/dT ranging from $-3.5\times10^{-4}$ to $-2\times10^{-4}/°C$. Thus, the refractive index decreases as the temperature increases. The lens E of negative power has its focal length $r_2$ which increases as the temperature rises in a negative direction to a focal length $r_4$ as indicated by the dotted lines.

Stated otherwise, temperature-dependent variations in the focal point and focal plane of a combination of convex and concave lenses cancel each other.

Therefore, such a lens combination results in a temperature-compensated lens system.

Figure 3:
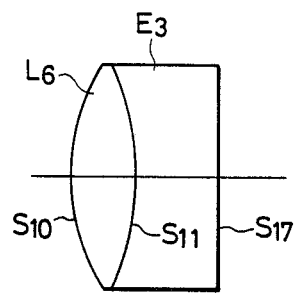
FIG. 3 is a schematic view showing in principle the arrangement of a lens system of the present invention.

One fundamental structure of a lens system comprising a plastic lens and a lens of a liquid or gel material is shown in FIG. 3. In FIG. 3, a convex plastic lens $L_6$ has opposite surfaces $S_{10}$ and $S_{11}$. A concave liquid lens $E_3$ is held against the surface $S_{11}$ of the convex lens $L_6$ and has a surface $S_{17}$ remote from the convex lens $L_6$.

Examples of the materials of the lenses, and temperature coefficients of refractive indices of these materials are given in the following Table 1:

TABLE 1

| Material | Refractive Index | dn/dT ($\times 10^{-4}/°C$) |
| --- | --- | --- |
| PMMA | 1.491 | $-1.2$ |
| Polystylene | 1.590 | $-1.4$ |
| Polycarbonate | 1.586 | $-1.4$ |
| Optical glass | 1.540 | $+0.027$ |
| Glycerin | 1.473 | $-2.2$ |
| $E_1$ | 1.443 | $-2.9$ |
| $E_2$ | 1.438 | $-3.0$ |
| Silicone oil | 1.403 | $-3.2$ |
| Silicon gel | 1.405 | $-3.2$ |
| Water | 1.333 | $-1.0$ |

PMMA represents polymethyl methacrylate, i.e., an acrylic resin. It is preferable that the liquid material of the liquid lens comprise a mixture of 20 to 100 weight % of glycerin and 80 to 0 weight % of ethylene glycol. If the ethylene glycol would be at around 100% by weight, the liquid would be solidified at a temperature of $-12°$ C. which is not practical. Therefore, the glycerin should be added to the liquid. For instance, $E_1$ is a mixture of 30 weight % of glycerin and 70 weight % of ethylene glycol. The refractive index of the mixture defined in this range is close to that of the glass or plastic. Also, if the mixture is selected from this range, it is possible to suitably thin the glycerin having a high viscosity with the ethylene glycol in order to make uniform the temperature distribution of the liquid material. The refractive index and dn/dT at $E_1$ indicates those values of the mixture $E_1$ at 30° C. The refractive index and dn/dT at $E_2$ indicates those values of the mixture $E_1$ at 45° C.

From the Table 1, it can be understood that temperature-dependent variations in the power (refractive index/focal length) of the lens system shown in FIG. 3 can substantially be eliminated. More specifically, since the refractive index and the focal length vary with temperature, such variations can be cancelled out by using a convex lens made of a material having a small absolute value $|dn/dT|$ for the temperature coefficient and by using a concave lens made of a material having a large absolute value $|dn/dT|$ of temperature coefficient. The value of dn/dT which indicates a temperature-dependent variation in the refractive index of the liquid or gel material is lower than $-2.0\times10^{-4}/°C$. in order to cancel out variations in the refractive index of the plastic material, variations in the focal length thereof, and variations in the lens power. The more the absolute value of the temperature coefficient of the refractive index of the liquid or gel material deviates from the absolute value of the temperature coefficient of the refractive index of the plastic, the smaller the curvature of the surface $S_{11}$ (FIG. 3) may be, i.e., the smaller the negative power of the surface $S_{11}$ of the plastic lens may be for temperature compensation, and also the smaller the amount of the material used, with the result that the cost of the lens system may be reduced. The lens unit $L_6$ and $E_3$ is to be located at a frontmost position of a lens system.

In FIG. 3, if the surface $S_{11}$ of the plastic lens $L_6$ is made spherical, since the plastic lens $L_6$ is located adjacent to or in a contact with the liquid $E_3$, it is possible to reduce a thickness of the plastic lens $L_6$ without any adverse effect against other aberrations.

Also, in FIG. 2, since the effective power of the plastic lens $L_6$ is smaller close to the optical axis, in order to effectively compensate for the affect of the temperature difference, it is preferable to arrange the lens elements so that a flux of light converged into a single point may pass through an area defined by 50% or more effective lens diameter of the lens system.

Figure 4:
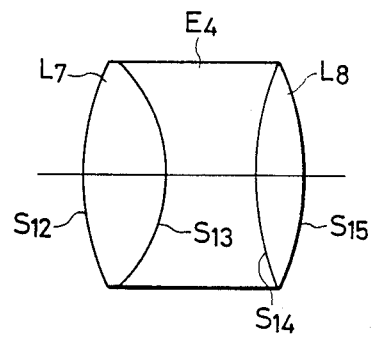
FIG. 4 is a schematic view of a lens system according to another embodiment of the present invention.

FIG. 4 shows a lens system according to another embodiment which comprises a convex plastic lens $L_7$ having surfaces $S_{12}$ and $S_{13}$, a convex plastic lens $L_8$ having surfaces $S_{14}$ and $S_{15}$, and a concave liquid or gel lens $E_4$ having a refractive index with its temperature coefficient dn/dT ranging from $-4.0\times10^{-4}$ to $-2.0\times10^{-4}/°C$. This lens system substantially eliminates temperature-dependent variations in the total power because temperature dependent variations of the plastic material and the liquid or gel material are canceled out by each other.

In the case where the lens $L_8$ is made of glass, the temperature coefficient dn/dT is very small at $+0.027$. Therefore, this hybrid system may compensate for the temperature-dependent variations.

FIG. 5 schematically illustrates other lens system arrangements similar to that shown in FIG. 4. Temperature compensation can be effected insofar as a plastic lens has a surface of positive power held against one surface of a liquid lens. FIG. 5 shows at (a) through (l) lens systems each having plastic lenses LL and LR held against opposite surfaces of a liquid lens E. The lens systems shown at (b), (d), (e), and (k) in particular are temperature-compensated per se as the optical power of those lens systems in their entity is positive. Also, the lens unit $L_7$, $E_4$ and $L_8$ is to be located at a frontmost position of a lens system.

FIG. 6 shows the arrangement of a lens system according to an embodiment of the present invention. The lens system includes a convex plastic lens $L_1$ on the left, an aspherical plastic lens $L_2$ on the right, and a concave liquid lens $E_1$ sealed between these lenses $L_1$ and $L_2$. The liquid of the liquid lens $E_1$ and the cooling liquid $E_2$ comprises a mixture of 30 weight % of glycerin and 70 weight % of ethylene glycol. The measured temperature coefficient dn/dT of the liquid which indicates a temperature-dependent variation in the refractive index is $-2.9\times10^{-4}/°C$. The lens system also includes a convex plastic lens $L_3$ as a second lens unit and a plastic lens $L_4$. The cooling liquid $E_2$ fills the space between the plastic lens $L_4$ and a flat glass $L_5$ of the CRT and thus also acts as a lens. Each of the plastic lenses $L_1$ through $L_4$ is made of PMMA. The lens surfaces other than $S_8$ are made aspherical. The lenses have surfaces $S_1$ through $S_9$, $S_{20}$. The radii of curvature of these lens surfaces of the optical axis, the distances of these lens surfaces from the screen S on the optical axis, and the refractive indices of the lens surfaces are given in the following Table 2:

TABLE 2

|  | Radius of curvature (mm) | Distance (mm) | Refractive index |
|---|---|---|---|
| Screen |  | 0 | 1.0000 |
| $L_1 \; S_1$ | 823.81 | 1100.00 | 1.4929 |
| $S_2$ | −270.27 | 1127.84 | 1.4929 |
| $E_1$ |  |  | 1.44270 |
| $L_2 \; S_3$ | 200.98 | 1397.84 | 1.49294 |
| $S_4$ | −423.99 | 1419.48 | 1.49294 |
| $L_3 \; S_5$ | 108.68 | 1420.68 | 1.49294 |
| $S_6$ | −555.65 | 1453.68 | 1.49294 |
| $L_4 \; S_7$ | −70.35 | 1573.54 | 1.49114 |
| $S_8$ | −93.00 | 1578.54 | 1.49114 |
| $E_2$ |  |  | 1.43830 |
| $L_5 \; S_9$ |  | 1582.84 | 1.54000 |
| $S_{20}$ |  | 1592.84 | 1.54000 |

The values for the plastic lens $L_4$ and the cooling liquid lens $E_3$ are corrected values corresponding to a temperature rise of $+15°$ C. above ambient when they are actually mounted. The plastic and liquid materials of the lenses $L_4$ and $E_2$ are the same as those of the other corresponding lenses.

The values given in the Table 2 are obtained at an ambient temperature of 30° C. Refractive indexes at the usual ambient temperature of $+10°$ C., and for elevated ambient temperatures of $+50°$ C. are indicated in the following Table 3.

TABLE 3

|  | 10° C. | 30° C. | 50° C. |
|---|---|---|---|
| $L_1$ | 1.49534 | 1.49294 | 1.49054 |
| $E_1$ | 1.44840 | 1.44270 | 1.43670 |
| $L_2$ | 1.49534 | 1.49294 | 1.49054 |
| $L_3$ | 1.49534 | 1.49294 | 1.49054 |
| $L_4$ | 1.49354 | 1.49114 | 1.48874 |
| $E_2$ | 1.44420 | 1.43830 | 1.43250 |
| $L_5$ | 1.54000 | 1.54000 | 1.54000 |

The refractive index values for the lenses $L_4$ and $E_2$ are converted values at a temperature rise $+15°$ C. above ambient when they are actually mounted. Temperature coefficients dn/dT indicative of temperature-dependent variations in refractive indices can be calculated from the above variations.

The variation in the focal length of the above lens system due to a temperature-dependent variation in the refractive index of a temperature change by 20° C. from 30° C. to 50° C. is 0.0201 mm. The variation in the focal length of the conventional hybrid lens system at the same temperature change is 0.23 mm. This numerical value largely affects the resolution of images projected onto the screen S.

Figure 7A:
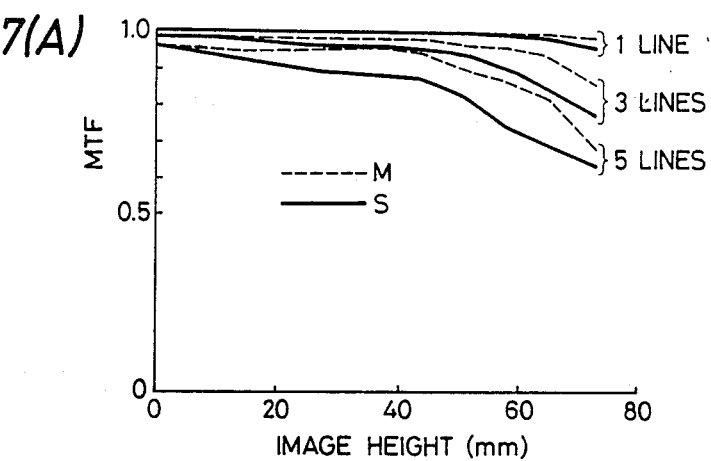
FIGS. 7(A), 7(B), 7(C) are diagrams showing MTF characteristics of the lens system of the invention.
Figure 7B:
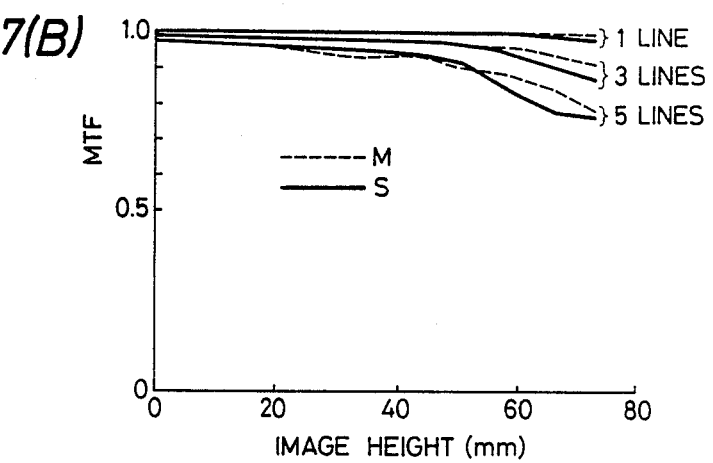
Figure 7C:
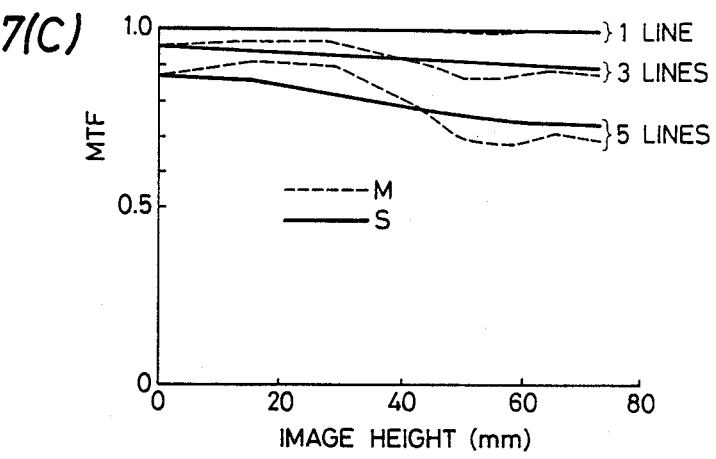

FIG. 7(A), 7(B) and 7(C) show temperaturedependent variations in the resolution. The horizontal axis of the graphs of FIGS. 7(A), 7(B) and 7(C) indicates an image height, as converted relatively to the screen, from the center of the projection surface $S_9$ of the electron gun CRT. The vertical axis of these graphs indicates MTF (Modulation Transfer Function) which is a response function representative of the transfer efficiency of spatial frequency characteristics as information tranfer of the optical system. The resolutions are indicated as the number of lines, i.e., 1, 3 and 5 lines for examples, for an image height of 1 mm. FIG. 7(A) shows the MTF at an ambient temperature of 10° C., FIG. 7(B) shows the MTF at an ambient temperature of 30° C., and FIG. 7(C) shows the MTF at an ambient temperature of 50° C. The solid curves indicate the MTF for sagital rays and the dotted curves indicate the MTF for meridional rays.

Figure 8A:
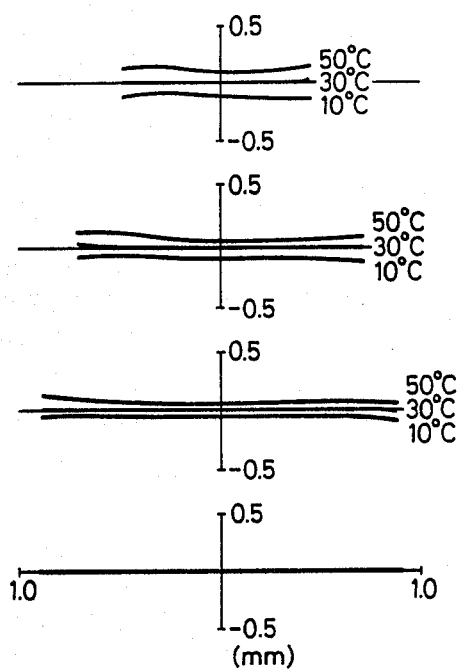
FIGS. 8(A), and 8(B) are diagrams showing aberrations of the lens system of the invention.
Figure 8B:
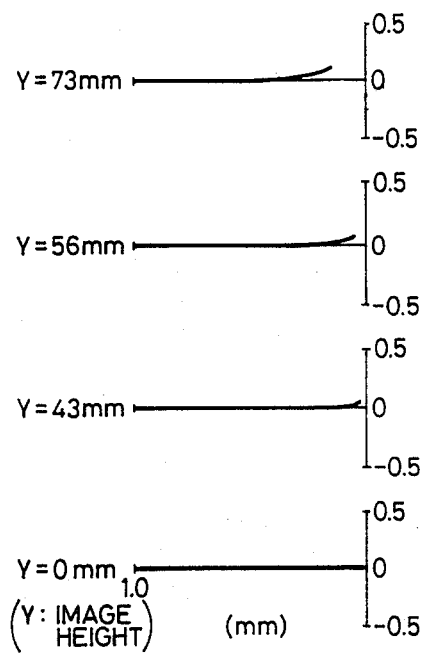
Figure 9A:
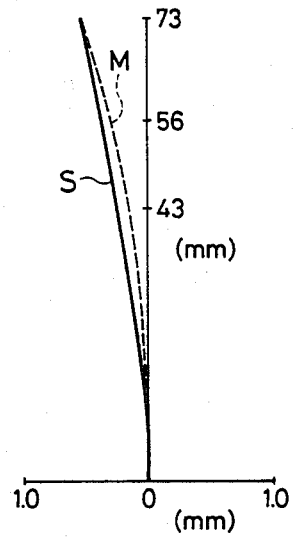
FIGS. 9(A) and 9(B) are graphs showing astigmatism and distortion of the lens system of the invention.
Figure 9B:
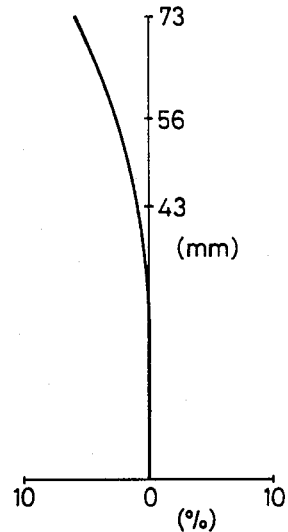

FIGS. 8(A) and 8(B) show coma at 10° C., 30° C. and 50° C. for each image height in the electron gun CRT of the lens system of the invention. FIG. 8(A) illustrates transverse aberrations for sagital rays and FIG. 8(B) transverse aberrations for meridional rays. FIG. 9(A) shows astigmatism of the lens system of the invention and FIG. 9(B) shows the distortion of the lens system of the invention.

In FIG. 6, the light beam emitted from the electron gun CRT propagates along the solid line and is refracted by the surface $S_7$ of the first plastic lens $L_4$, the surface $S_6$ of the second plastic lens $L_3$, and the surface $S_1$ of the fourth plastic lens $L_1$. All these surfaces $S_7$, $S_6$ and $S_1$ contact air which has a significantly different refractive index. The light beam is less refracted in other regions where the lens materials on either side of the surfaces have similar refractive indices. Hence, the light beam travels along the path $K_1$. The light beam would travel along the path $K_2$ if the liquid lens $E_1$ were replaced with air.

With the arrangement of the present invention, as described above, a temperature-compensated lens system comprises a convex plastic lens having positive power and a concave liquid lens of a liquid or gel material which is held against the plastic lens. The liquid or gel material has a temperature coefficient dn/dT ranging from $-4.0 \times 10^{-4}$ to $2.0 \times 10^{-4}$/°C. This temperature coefficient is indicative of the temperature-dependent variations in the refractive index of the liquid lens. Where the lens system is employed in a projection-type television display, the image forming plane will not be significantly moved even if the ambient temperature varies widely. As a result, the MTF is substantially prevented from being degraded and the resolution on the screen is not lowered, resulting in the display of high-quality images on the screen.

Dust and other foreign matter tend to be deposited on the plastic material due to static electricity. However, since the lens system uses an electrically conductive liquid material having a conductivity ranging from $5 \times 10^{-8}$ to $1 \times 10^{-6}$ mho/cm (mho is an inverse ohm), no static electricity is stored in the lens system and no dust is attached thereto. As a result, the resolution of images on the screen and the brightness on the screen are maintained at desired levels.

The liquid material is higher in thermal conductivity than the plastic material, and is uniform in temperature on account of convection. Thus, the lens system components which are held in contact with the liquid material are kept uniform in temperature, resulting in uniformity of refractive indices. The liquid material is not required to be annealed, unlike solid materials, and can maintain stable optical performance. The lens system of the invention can consequently provide high image quality over the entire area of the screen.

Even if the plastic lenses are of lower surface accuracy or ground to lower accuracy at surfaces to be held against the liquid lens, since the refractive index of the plastic material is close to that of the liquid or gel material, ground or blanked lens surfaces can be manufactured with a good yield. Therefore, the cost of the lens system is lowered to a great degree.

The refractive index of the plastic lens is closed to that of the liquid material of the liquid lens. Therefore, it is possible to make the contact surface therebetween aspherical while maintaining good performance of the lens system. It is therefore possible to direct the ray of the light at the marginal portion of the lens toward the optical axis better than the case of a simple spherical surface.

Although certain preferred embodiments have been shown and described, it should be understood that many changes and modifications may be made therein without departing from the scope of the appended claims.

We claim:

1. A temperature-compensated lens system comprising a plastic lens having a convex surface, and a liquid lens of negative power made of a liquid or gel material and held against said convex surface of said plastic lens, said liquid lens having a temperature coefficient dn/dT ranging from $-4 \times 10^{-4}$ to $-2.0 \times 10^{-4}/°C.$, said temperature coefficient indicative of a temperature-dependent variation in the refractive index of the liquid lens, said lens system having positive power in its entirety.

2. A temperature-compensated lens system according to claim 1, wherein said liquid material of the liquid lens comprises a mixture of 20 to 100 weight % of glycerin and 80 to 0 weight % of ethylene glycol.

3. A temperature-compensated lens system according to claim 1, wherein said liquid or gel material of the liquid lens comprises silicone oil or silicone gel.

4. A temperature compensated projection optical system, comprising:
a screen;
an electron gun CRT, having a sheet from which optical beams are emitted toward said screen; and
an optical system of positive power disposed between said sheet and said screen and including a first plastic lens having a convex surface and a lens of negative power held against said convex surface with a temperature coefficient of refractive index ranging from $-4 \times 10^{-4}$ to $-2.0 \times 10^{-4}/°C.$, said temperature coefficient indicative of a temperature-dependent variation in the refractive index of the liquid lens.

5. A temperature compensated projection optical system as recited in claim 4, wherein said negative power lens comprises a liquid or gel material.

6. A temperature compensated projection optical system as recited in claim 5, further comprising a second plastic lens held against said negative power lens on a side opposite said first plastic lens.

7. A temperature compensated projection optical system as recited in claim 5, further comprising a lens of a liquid or gel material held against said sheet.

8. A temperature-compensated lens system comprising a first lens unit composed of a first plastic lens having a convex surface, a liquid lens of negative power made of a liquid or gel material and held against said first plastic lens, said liquid lens having a temperature coefficient dn/dT range from $-4 \times 10^{-4}$ to $-2.0 \times 10^{-4}/°C.$, said temperature coefficient indicative of a temperature-dependent variation in the refractive index of the liquid lens, and a second plastic lens held against the other side surface of said liquid lens, and a second lens unit of positive power made of plastic.

9. A temperature-compensated lens system according to claim 8, wherein the lens surfaces of said first and second plastic lenses are made aspherical.

10. A temperature-compensated lens system according to claim 8, wherein said liquid material of the liquid lens comprises a mixture of 20 to 100 weight % of glycerin and 80 to 0 weight % of ethylene glycol.

11. A temperature-compensated lens system according to claim 8, wherein said liquid lens is made of silicone oil.

12. A temperature-compensated lens system according to claim 8, wherein said liquid lens is made of silicone gel.

13. A temperature-compensated lens system comprising a first lens unit composed of a plastic lens having a convex surface, a liquid lens of negative power made of a liquid or gel material and held against said plastic lens, said liquid lens having a temperature coefficient dn/dT range from $-4 \times 10^{-4}$ to $-2.0 \times 10^{-4}/°C.$, said temperature coefficient indicative of a temperaturedependent variation in the refractive index of the liquid lens, and a glass lens held against the other side surface of said liquid lens, and a second lens unit of positive power made of plastic.

14. A temperature-compensated lens system according to claim 13, wherein the lens surface of said plastic lens are made spherical.

15. A temperature-compensated lens system according to claim 13, wherein said liquid material of the liquid lens comprises a mixture of 20 to 100 weight % of glycerin and 80 to 0 weight % of ethylene glycol.

16. A temperature-compensated lens system according to claim 13, wherein said liquid lens is made of silicone oil.

17. A temperature-compensated lens system according to claim 13, wherein said liquid lens is made of silicone gel.

18. A temperature-compensated lens system comprising a first lens unit composed of a first plastic lens having a convex surface, a liquid lens of negative power made of a liquid or gel material and held against said first plastic lens, said liquid lens having a temperature coefficient dn/dT range from $-4 \times 10^{-4}$ to $-2.0 \times 10^{-4}/°C.$, said temperature coefficient indicative of a temperature-dependent variation in the refractive index of the liquid lens, and a second plastic lens held against the other side surface of said liquid lens, a second lens unit or positive power made of plastic, and a third lens unit located in front of a CRT gun, wherein said first lens unit is arranged so that a flux of light converging into a single point through said first lens unit passes through an area defined by 50% or more of an effective diameter of said first lens unit.

19. A temperature-compensated lens system according to claim 18, wherein the lens surface of said first and second plastic lenses are made aspherical.

20. A temperature-compensated lens system according to claim 18, wherein said liquid material of the liquid lens comprises a mixture of 20 to 100 weight % of glycerin and 80 to 0 weight % of ethylene glycol.

21. A temperature-compensated lens system according to claim 18, wherein said liquid lens is made of silicone oil.

22. A temperature-compensated lens system according to claim 18, wherein said liquid lens is made of silicone gel.

23. A temperature-compensated lens system comprising a first lens unit composed of a plastic lens having a convex surface, a liquid lens of negative power made of a liquid or gel material and held against said plastic lens, said liquid lens having a temperature coefficient dn/dT range from $-4\times10^{-4}$ to $-2.0\times10^{-4}/°C.$, said temperature coefficient indicative of a temperature-dependent variation in the refractive index of the liquid lens, and a glass lens held against the other side surface of said liquid lens, a second lens unit of positive power made of plastic, and a third lens unit located in front of a CRT gun, wherein said first lens unit is arranged so that a flux of light converging into a single point through said first lens unit passes through an area defined by 50% or more of an effective diameter of said first lens unit.

24. A temperature-compensated lens system according to claim 23, wherein the lens surfaces of said plastic lens are made aspherical.

25. A temperature-compensated lens system according to claim 23, wherein said liquid material of the liquid lens comprises a mixture of 20 to 100 weight % of glycerin and 80 to 0 weight % of ethylene glycol.

26. A temperature-compensated lens system according to claim 23, wherein said liquid lens is made of silicone oil.

27. A temperature-compensated lens system according to claim 23, wherein said liquid lens is made of silicone gel.

28. A temperature-compensated lens system comprising a first plastic lens having a convex surface, a liquid lens of negative power made of a liquid or gel material and held against said first plastic lens, said liquid lens having a temperature coefficient dn/dT range from $-4\times10^{-4}$ to $-2.0\times10^{-4}/°C.$, said temperature coefficient indicative of a temperature-dependent variation in the refractive index of the liquid lens, and a second liquid lens held against the other side surface of said liquid lens, whereby temperature variation in refractive index of the overall lens system may be compensated for.

29. A temperature-compensated lens system according to claim 28, wherein the lens surfaces of said first and second plastic lenses are made aspherical.

30. A temperature-compensated lens system according to claim 28, wherein said liquid material of the liquid lens comprises a mixture of 20 to 100 weight % of glycerin and 80 to 0 weight % of ethylene glycol.

31. A temperature-compensated lens system according to claim 28, wherein said liquid lens is made of silicone oil.

32. A temperature-compensated lens system according to claim 28, wherein said liquid lens is made of silicone gel.

33. A temperature-compensated lens system comprising a plastic lens having a convex surface, a liquid lens of negative power made of a liquid or gel material and held against said plastic lens, said liquid lens having a temperature coefficient dn/dT range from $-4\times10^{-4}$ to $-2.0\times10^{-4}/°C.$, said temperature coefficient indicative of a temperature-dependent variation in the refractive index of the liquid lens, and a glass lens held against the other side of the liquid lens, whereby temperature variation in refractive index of the overall lens system may be compensated for.

34. A temperature-compensated lens system according to claim 33, wherein the lens surface of said plastic lens and said glass lens are made aspherical.

35. A temperature-compensated lens system according to claim 33, wherein said liquid material of the liquid lens comprises a mixture of 20 to 100 weight % of glycerin and 80 to 0 weight % of ethylene glycol.

36. A temperature-compensated lens system according to claim 33, wherein said liquid lens is made of silicone oil.

37. A temperature-compensated lens system according to claim 33, wherein said liquid lens is made of silicone gel.

38. A temperature-compensated lens system according to claim 1, wherein said convex surface of said plastic lens is made aspherical.

* * * * *